Aug. 4, 1925.  1,548,116
J. CHRISTIE
PHOTOGRAPHIC CAMERA BODY
Filed Sept. 26, 1923   3 Sheets-Sheet 1
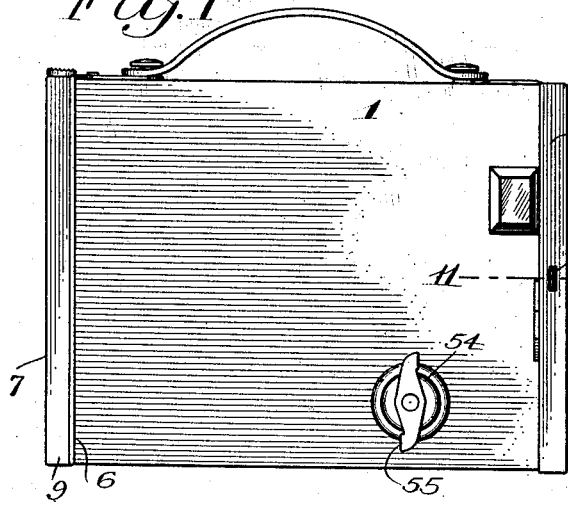
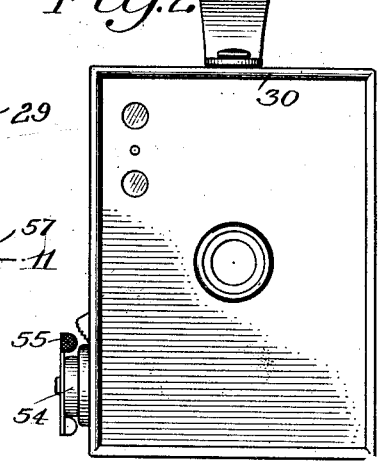
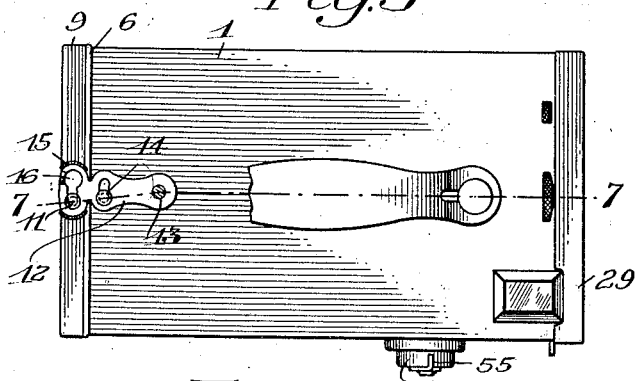
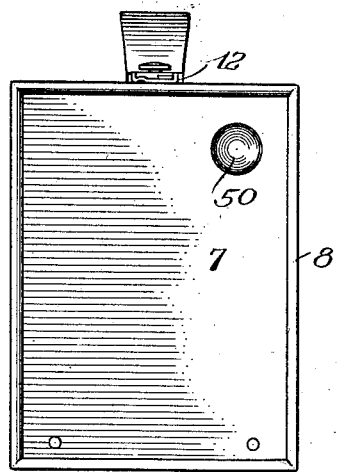
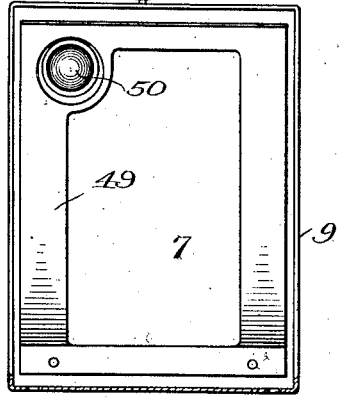
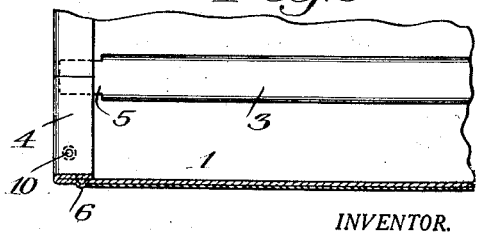
INVENTOR.
John Christie
BY
his ATTORNEY

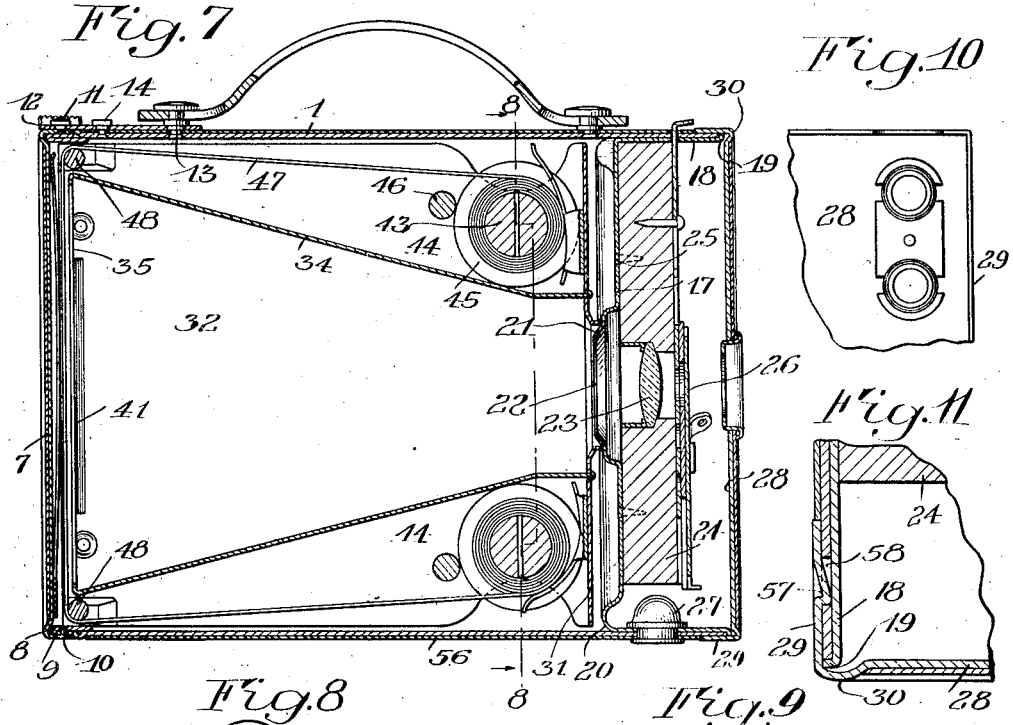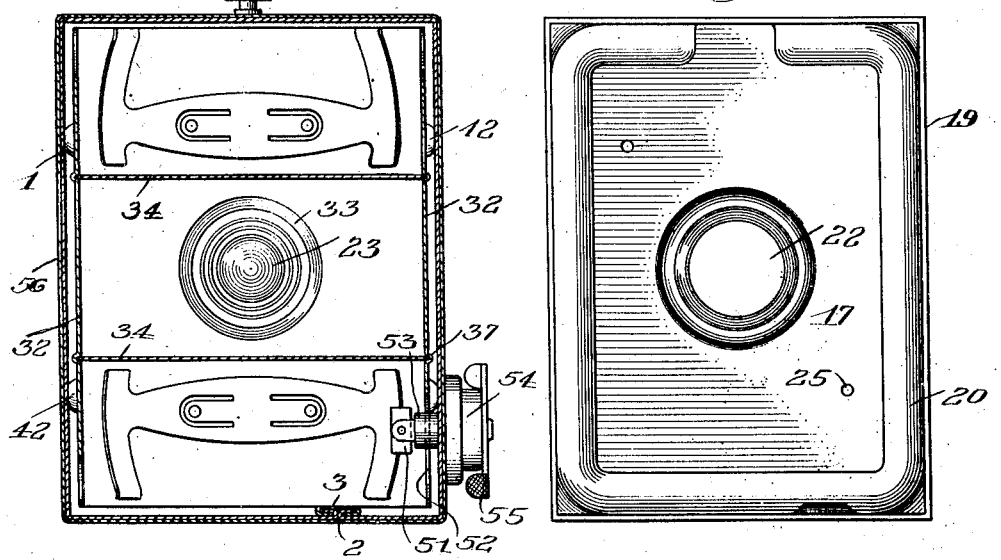

Aug. 4, 1925. 1,548,116
J. CHRISTIE
PHOTOGRAPHIC CAMERA BODY
Filed Sept. 26, 1923 3 Sheets-Sheet 3
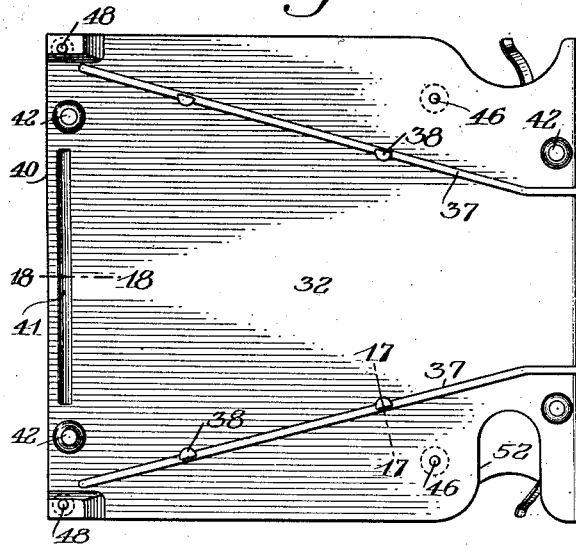
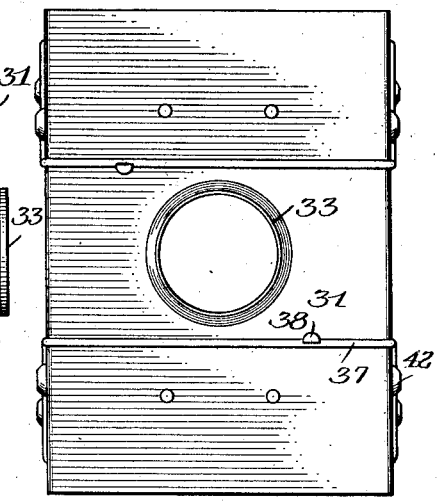
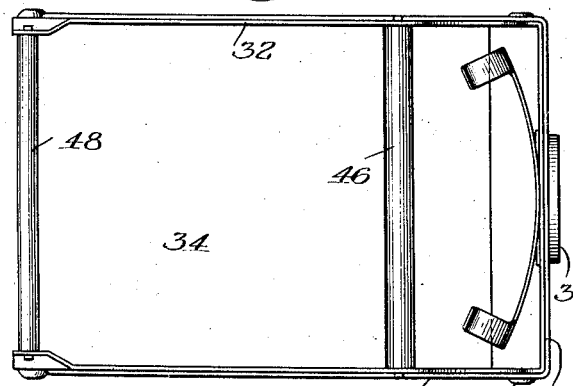
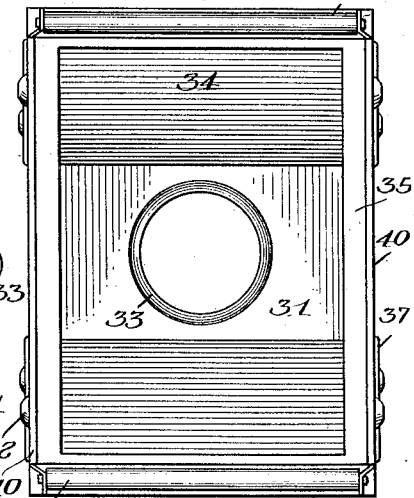
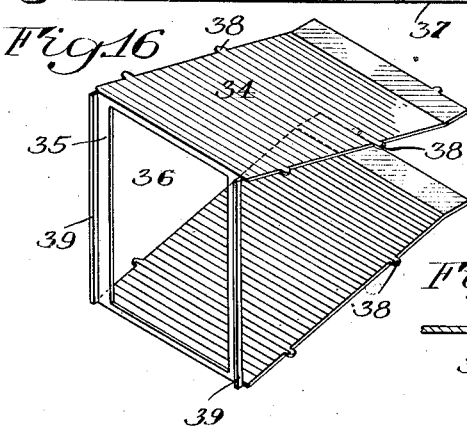
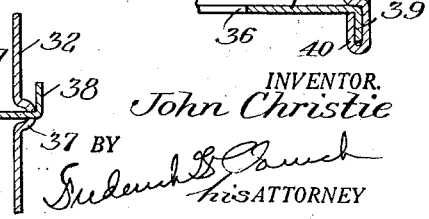
INVENTOR.
John Christie
BY
his ATTORNEY Patented Aug. 4, 1925.

1,548,116

UNITED STATES PATENT OFFICE.

JOHN CHRISTIE, OF ROCHESTER, NEW YORK, ASSIGNOR TO EASTMAN KODAK COMPANY, OF ROCHESTER, NEW YORK, A CORPORATION OF NEW YORK.

PHOTOGRAPHIC-CAMERA BODY.

Application filed September 26, 1923. Serial No. 665,027.

*To all whom it may concern:*

Be it known that I, JOHN CHRISTIE, a citizen of the United States, residing at Rochester, in the county of Monroe and State of New York, have invented certain new and useful Improvements in Photographic-Camera Bodies; and I do hereby declare the following to be a full, clear, and exact description of the same, reference being had to the accompanying drawings, forming a part of this specification, and to the reference numerals marked thereon.

My present invention relates to photography and more particularly to photographic cameras and it has for its object to provide an improved construction for the manufacture of box cameras or camera bodies whereby they may be constructed throughout of sheet metal. The improvements are directed in part to the formation of the metal case or body, the lens board and the various partitions within the body that go to make up the exposure chamber, the film chambers etc. To these and other ends the invention resides in certain improvements and combinations of parts all as will be hereinafter more fully described, the novel features being pointed out in the claims at the end of the specification.

In the drawings:

Figure 1 is a side elevation of a box camera constructed in accordance with and illustrating one embodiment of my invention;

Figure 2 is a front elevation thereof;

Figure 3 is a top plan view with a portion of the carrying handle broken away;

Figure 4 is a rear view;

Figure 5 is a front or interior view of the back;

Figure 6 is an enlarged fragmentary view partly in section of two adjoining walls of the body shell one of which carries the seam;

Figure 7 is an enlarged longitudinal sectional view through the camera;

Figure 8 is a transverse sectional view taken on the line 8—8 of Figure 7;

Figure 9 is a rear view of the lens board viewed from the rear of the camera with the back removed;

Figure 10 is a detail fragmentary elevation of a portion of the front plate containing the finder lenses;

Figure 11 is an enlarged sectional view taken on the line 11—11 of Figure 1 showing the manner in which the front plate is secured to the body;

Figure 12 is an enlarged side elevation of the roll holder;

Figure 13 is an enlarged front elevation thereof;

Figure 14 is an enlarged top plan view of the same;

Figure 15 is a rear view of the roll holder;

Figure 16 is a perspective view of one of the sheet metal parts of the roll holder detached;

Figure 17 is an enlarged fragmentary detail section on the line 17—17 of Figure 12, and Figure 18 is an enlarged fragmentary detail section on the line 18—18 of Figure 12.

Similar reference numerals throughout the several views indicate the same parts.

The specific type of camera in connection with which I have illustrated my invention is a box camera having a non-folding body containing a roll holder that is inserted or removed through the rear end of the box upon the removal of the back cover. The exposure chamber is formed within the roll holder and the latter cooperates with the body, when in place therein, to provide film chambers for film rolls that are inserted in the roll holder while the latter is detached. Referring more particularly to the drawings 1 indicates the body which is in the form of a rectangular tube made of a single piece of sheet metal having an interior longitudinal seam of the nature indicated at 2 in Figure 8, that is, the edges of the sheet are brought together and then turned in opposite direction on the inside of the tube. A locking device 3 consisting of a flattened tube having a slot therein (see also Figure 6) is slipped over these oppositely hooked edges and flattened down against them so that a lock seam is produced. The ends of the tube are folded in as indicated at 4 in Figure 6 to give added rigidity to the structure and to also prevent the appearance of a raw edge at the end of the body tube. The locking device 3 is formed with a tongue or extension 5 at the rear end which is clamped beneath the inturned flange 4 and is thereby held in place. Furthermore, a bead 6 extending transversely around the body tube near the rear end and projecting from the outer surface opposite the inturned flange 4 further adds to the rigidity of the structure and additionally forms a shoulder for the flanges of the camera back.

The back 7 is in the form of an ordinary flanged cover except that on its rear side a marginal bead 8 is embossed therein into which the rear end of the body tube fits when the back is applied thereto, the flanges 9 of the back abutting the transverse bead 6 on the body. Openings in the flange 9 at one side of the back are engeged over pins 10 passing through the flange 4 at one side of the body. At the opposite side of the back is a central headed pin 11. A suitable catch 12 pivoted to the body engages this pin 11 to lock the back in place, the catch in the present instance being pivoted at 13 (Figure 3) and slotted to work on a headed guide pin 14. By means of a roughened finger portion 15 a key hole slot 16 is released from or interlocked with the pin 11.

A cup shaped member resembling a tray fits into the front end of the body tube the same also being pressed out of sheet metal. It comprises a lens board 17 at its bottom and side walls 18 which terminate at their forward edges in short flanges 19 of a length about equal to the thickness of the material of the body tube so that they act as shoulders engaging with the front end of the latter and defining the position of the lens board 17 within the camera. The lens board 17 has an embossed marginal bead 20 on its rear side and also a rearwardly projecting embossed central protuberance 21 surrounding a lens opening 22.

The lens 23 is directly carried by a preferably wooden block 24 secured to the lens board 17 by screws passing through the latter at 25. This block also carries the shutter indicated generally at 26 together with its controlling devices all of which does not require specific description inasmuch as it has nothing to do with the general construction with which this invention is concerned. Two ordinary tripod sockets 27 extending through the bottom and a side wall of the body also pass through the flanges 18 of the lens board 17 and being riveted in place assist in holding the lens board in position.

The front of the lens chamber formed by the lens board 17 is closed by a front plate 28 of much the same character as the back 7 in that it has flanges 29 fitting over the body tube and an embossed marginal rib 30 on the front side adjacent thereto. In engaging over the body the flanges 29 lie flush against the latter and also against the edges of the shoulder flanges 19 on the lens board member which flanges rest within the embossed ribs of the front.

The back 7 is removed for loading and unloading the roll holder which latter occupies the entire interior of the body in rear of the lens board when the roll holder is in place, the same being removable through the rear of the camera. It is shown removed in Figures 12 to 15 inclusive. It consists of one piece of sheet metal bent into a yoke shaped form forming a front wall 31 and side walls 32. The front wall has a central lens opening 33 with a surrounding forwardly projecting collar that cooperates with the boss 21 on the lens board 17 to prevent light from leaking into the spool chambers hereinafter described. Another piece of sheet metal is bent as shown in Figure 16 to form two other converging sides 34 connected at the rear by a frame piece 35 that furnishes the exposure opening at the rear of the camera. The other two sides and the front 31 are embossed at 37 along the lines of intersection with the walls 34 the edges of which rest in the resulting grooves and are provided with ears 38 that extend therethrough and are clinched over as a fastening means. The free edges of the frame piece 35 are bent rearwardly at 39 to form narrow flanges over which are clinched flanges 40 on the rear edges of the walls 32 in the manner shown in detail in Figure 18 and just back of the frame piece 35 the walls 32 are bumped in as shown at 41 to hold these flanges in engagement. Projections 42 formed in the walls 32 engage the interior surfaces of the camera body to hold the roll holder in place and keep the ears 38 and other parts out of contact.

The film spools 43 shown in Figure 7 are accommodated in the depressions 44 comprised between the forward downwardly inclined ends of the walls 34 and the adjacent top or bottom wall of the body 1. Their ends abut the walls 32 and their flanges 45 are retained in rolling contact with rollers 46 journaled in the walls 32 but the construction of the chambers and the mode of operation of the film mechanism is another invention and does not require detailed description here. The film 47 is drawn from one spool over guide rolls 48 supported at the rear between the walls 32 across the exposure opening 36 and on to the other spool, the back 7 being provided with a spring plate 49 to hold the film flat. 50 represents the ruby window in the back.

The roll holder is retained within the body by the winding key 51 which engages one of the spools through a cutaway portion 52 in one of the walls 32. The stud 53 on which the key is carried has a bearing 54 on the wall of the body through which latter it extends to both rotate and to slide axially so that the key may be withdrawn by pulling outward on the finger piece 55 by which it is rotated and the spool and roll holder released.

The camera may be covered with leather or other finishing material as indicated at 56 in which case it is run up to or lies in the depressions formed by the various ribs 8, 6 and 30 which produces a neat appearance and prevents the covering from becoming frayed.

Reverting to the front plate 28 this is held in place by catch lugs or shoulders 57 struck inwardly from the flanges thereof and engaging in openings 58 in the walls of the body 1 as shown in Figure 11, By pressing inwardly on these walls the lugs are released.

I claim as my invention:

1. In a metallic camera, the combination with a body tube, of a lens board embodying a cup shaped member inserted in the end of the tube with side flanges disposed against the side walls of the latter and outwardly turned edge flanges on the side flanges cooperating with the end edges of the body tube to define the position of the lens board within the body.

2. In a metallic camera, the combination with a body tube, of a lens board embodying a cup shaped member inserted in the end of the tube with side flanges disposed against the side walls of the latter and outwardly turned edge flanges on the side flanges cooperating with the end edges of the body tube to define the position of the lens board within the body, and a front plate having flanges fitting over the body tube exteriorly thereof.

3. In a metallic camera, the combination with a body tube, of a lens board embodying a cup shaped member inserted in the end of the tube with side flanges disposed against the side walls of the latter and outwardly turned edge flanges on the side flanges cooperating with the end edges of the body tube to define the position of the lens board within the body, and a front plate having flanges fitting over the body tube exteriorly thereof, said front plate being provided with a marginal embossed bead into which the edge flanges of the cup shaped member are received.

4. In a metallic camera, the combination with a body tube, of a roll holder detachably contained within the body, said roll holder embodying a yoke shaped metal plate constituting a front and two side walls, the latter having embossed channels therein, and another yoke shaped plate constituting an exposure frame at the rear and the other two side walls, the edges of the latter being received within the channels of the first mentioned side walls and being provided with ears extending through and clinched on the exterior thereof.

5. In a metallic camera, the combination with a body tube, of a roll holder detachably contained within the body, said roll holder embodying a yoke shaped metal plate constituting a front and two side walls, and another yoke shaped plate constituting an exposure frame at the rear and the other two side walls, the latter being confined between the first mentioned side walls and the exposure frame being provided with rearwardly turned flanges over which the rear edges of the first mentioned side walls are doubled.

6. In a metallic camera, the combination with a body tube having a lens plate therein provided with a rearwardly embossed lens opening, of a detachable roll holder adapted to be inserted and removed through the rear of the camera and divided into an exposure chamber and film chambers, said roll holder embodying a front wall having a lens opening in the exposure chamber, said opening being surrounded by a collar cooperating with the embossed portion of the lens board to prevent light from leaking into the film chambers.

JOHN CHRISTIE.